US006164623A

United States Patent [19]

Ito et al.

[11] Patent Number: 6,164,623

[45] Date of Patent: Dec. 26, 2000

[54] THROTTLE VALVE CONTROL DEVICE

[75] Inventors: Yoshiki Ito; Sunao Kitamura, both of Nagoya, Japan

[73] Assignees: Aisan Kogyo Kabushiki Kaisha, Aichi-Ken; Toyota Jidosha Kabushiki Kaisha, Toyota, both of Japan

[21] Appl. No.: 09/318,252

[22] Filed: May 25, 1999

[30] Foreign Application Priority Data

Jun. 11, 1998 [JP] Japan .................................. 10-163827

[51] Int. Cl.[7] ................................ F16K 1/22; F02D 9/08

[52] U.S. Cl. ............................................ 251/305; 123/337

[58] Field of Search ............................... 251/129.11, 288, 251/205; 123/337

[56] References Cited

U.S. PATENT DOCUMENTS

| | | | |
|---|---|---|---|
| 4,408,581 | 10/1983 | Pfalzgraf et al. | 123/339 |
| 4,860,706 | 8/1989 | Suzuki et al. | 123/337 |
| 5,029,564 | 7/1991 | Neutzer | 123/337 |
| 5,168,852 | 12/1992 | Moriguchi et al. | 123/400 |
| 5,188,078 | 2/1993 | Tamaki | 123/403 |

FOREIGN PATENT DOCUMENTS 3-271528 12/1991 Japan .

*Primary Examiner*—Kevin Shaver
*Assistant Examiner*—David A. Bonderer
*Attorney, Agent, or Firm*—Finnegan, Henderson, Farabow, Garrett & Dunner, L.L.P.

[57] ABSTRACT

In a throttle valve control device 11, which controls a throttle valve 14 to rotate in a normal direction from a fully closed position S to a fully opened position F or in a reverse direction from the fully opened position F to the fully closed position S in order to open or close an air intake passage 20 of an engine, there are provided a return spring 19 for urging the throttle valve 14 in the reverse rotation direction and an adjustment screw 25 for causing the throttle valve 14 to stop in a predetermined position when the valve 14 is rotated by a predetermined angle θ in the reverse rotation direction from the fully closed position S to the predetermined position.

7 Claims, 8 Drawing Sheets

THROTTLE VALVE CONTROL DEVICE

BACKGROUND OF THE INVENTION

1. Field of the Invention

The present invention relates to a throttle valve control device for electrically controlling an opening of a throttle valve of an engine.

2. Description of Related Art

Explanation is made on a conventional throttle valve control device based on Japanese patent application laid-open No. 3-271528, which was filed by the applicant of the present invention. FIG. 8 shows a simplified view of the structure of the throttle valve control device disclosed in the above publication.

A throttle valve 110 is mounted on a shaft 103 of which an end is connected with a motor 102 for rotating the throttle valve 110. Regarding the opening/closing direction of the valve 110, a rotating direction (an opening direction) from a fully closed position to a fully opened position is regarded herein as the normal rotation direction, and a rotating direction (a closing direction) from the fully opened position to the fully closed position is regarded as the reverse rotation direction.

Another end of the shaft 103 is engaged with a lever 105 for fixedly holding the throttle valve 110 in a predetermined position when the engine is stopped. The lever 105 is connected with an end of a return spring 107, and another end of the spring 107 is fixed to a casing. The return spring 107 acts to always urge the throttle valve 110 in the reverse rotation direction through the lever 105. The lever 105 comes into contact with a stopper 108 at a predetermined position and is stopped there. The casing to which the return spring 107 is fixed is provided with a full close stopper 109 for holding the throttle valve 110 in the fully closed position. The lever 105 is also connected with an end of a spring 106, and another end of the spring 106 is connected with the shaft 103. The spring 106 acts to always urge the throttle valve 110 in the normal rotation direction.

The operation of the conventional throttle valve control device constructed as above is explained below. As shown in FIG. 9, the throttle valve 110 can be held in a fully opened position F, a fully closed position S, and a slightly opened position N.

The reason why the slightly opened position N is determined to be between the fully opened position F and the fully closed position S is to prevent the following possibility. In the case of the throttle valve 110 that is held in the fully closed position S whenever the engine is stopped, the valve 110 would be unable to open if the shaft 103 or the throttle valve 110 freezes under low temperatures in a cold district, etc., which results in an engine starting failure. The similar possibility may occur if adhesive materials such as combustion products and the like which generate between an air-intake tube and a valve with the engine motion adhere to the throttle valve 110. The slightly opened position N is therefore set so that the valve 110 is held in a state of opening by a predetermined amount from the fully closed position upon stop of the engine.

When the engine is stopped, the lever 105 is urged by the return spring 107 to a position where the lever 105 engages the stopper 108, while the shaft 103 is urged by the spring 106 to position where the shaft 103 engages the lever 105. Accordingly, the throttle valve 110 is held in the slightly opened position N.

In the operation of the valve 110 from the slightly opened position N to the fully opened position F, although the return spring 107 exerts the urging force on the shaft 103 in the reverse rotation direction through the lever 105, the driving torque of the motor 102 is so larger than the urging force of the return spring 107 that the throttle valve 110 is allowed to fully open. That is to say, driving of the motor 102 causes the shaft 103 connected with the motor to rotate and the lever 105 engaging with the shaft 103 to operate against the return spring force until the lever 105 comes into contact with the stopper 108.

In the operation of the valve 110 from the slightly opened position N to the fully closed position S, on the other hand, although the spring 106 exerts the urging force on the shaft 103 in the normal rotation direction, the driving torque of the motor 102 is so larger than the urging force of the spring 106 that the throttle valve 110 is allowed to fully close. That is to say, driving of the motor 102 causes the shaft 103 to rotate until the shaft 103 comes into contact with the full close stopper 109.

FIG. 10 shows a relationship between the opening of the throttle valve 110 and the urging force of the shaft 103, where the horizontal axis indicates the opening of the valve 110, S indicates the fully closed position thereof, N indicates the slightly opened position, and F indicates the fully closed position. The vertical axis indicates the urging force exerted on the shaft 103, taking the torque in the full-closing direction as a positive side and the torque in the full-opening direction as a negative side.

In the operation of the valve 110 from the slightly opened position N to the fully opened position F, the urging force of the return spring 107 at an initial value $R_0$ is first exerted on the shaft 103 being in the slightly opened position N and then the urging force R gradually increases in proportion to the degree of the opening. In the operation from the slightly opened position N to the fully closed position S, the urging force of the spring 106 at an initial value $P_0$ is first exerted on the shaft 103 being in the slightly opened position N and then the urging force P gradually increases as the opening decreases.

In this way, at the slightly opened position N, the direction of the spring torque on the shaft 103 is changed in reverse in correspondence to the urging force exerted on the shaft 103 by the spring 106 or 107. This needs the control to drive the motor 102 to reversely rotate at the slightly opened position N.

FIG. 11 shows a bridge circuit to control the motor 12. In FIG. 11, +B indicates a power source, and B1 to B4 indicate transistors. In the operation from the slightly opened position N to the fully opened position F, electric current from the power source is fed through the transistor B1, the motor 102, and the transistor B4 in order, whereby the motor 102 is driven to rotate in the normal rotation direction against the urging force of the return spring 107 acting in the reverse rotation direction. To the contrary, in the operation from the slightly opened position N to the fully closed position S, the current from the power source is fed through the transistor B3, the motor 102, and the transistor B2 in order, whereby the motor 102 is driven against the urging force of the spring 106 in the normal rotation direction.

According to the conventional device disclosed in the Japanese patent application laid-open No. 3-271528, though inconveniences caused by the freezing or the adhesive materials, etc. could be solved, the reverse rotation of the motor just at the slightly opened position N must be controlled in respect of both of the valve opening and closing directions. For such the control, an electronic circuit such as the bridge circuit shown in FIG. 11 is required. The conventional throttle valve control device must further have the two urging devices for urging the shaft in opposite directions and the lever, stopper, etc. which engage with the urging devices. This results in a complicated structure for a mechanism.

Consequently, there are problems of causing an enlarged throttle valve control device and an increase of cost resulting therefrom.

SUMMARY OF THE INVENTION

The present invention has been made in view of the above circumstances and has an object to overcome the above problems and to provide a throttle valve control device capable of fixedly holding a throttle valve in a predetermined position where the valve is turned by a predetermined angle when an engine is stopped and also simplifying an electronic circuit and mechanism of the throttle valve control device.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a throttle valve control device including a throttle valve for opening and closing an air intake passage of an engine for an automobile, a rotating device for causing the throttle valve to rotate in a normal direction from a fully closed position to a fully opened position, and to rotate in a reverse direction from the full open position to the full close position, an urging device for urging the throttle valve in the reverse direction, and a stopper member for stopping the throttle valve at a predetermined position when the valve has been rotated by a predetermined angle in the reverse direction from the full close position to the predetermined position.

In the throttle valve control device according, preferably, the predetermined position determined by the stopper member is a position of the throttle valve enabling starting of the engine even if the throttle valve ices or freezes under low temperatures in a cold district and so on, or a position of the throttle valve to provide a minimum opening required for shunt travel of an automobile to a turnout and other places at the time of engine trouble.

In the throttle valve control device, preferably, the urging device always urges the throttle valve in the reverse rotation direction.

In the throttle valve control device, preferably, the urging device includes a double system torsion spring. This double system torsion spring may be integrally constituted of a pair of springs that are identical in material and size. When one of the springs constituting the double system torsion spring is broken, the throttle valve is retained in the predetermined position by an urging force of the other spring.

In the throttle valve control device, preferably, the rotating device includes a torque motor, and the urging force of the urging device is smaller than the driving torque of the torque motor while larger than the torque at the time of deenergization of the torque motor.

According to the throttle valve control device mentioned above, the throttle valve receiving the urging force of the return spring is rotated by a predetermined angle from the fully closed position in the reverse rotation direction and then it is fixedly held with aid of the stopper member in the predetermined position.

During an idling condition of the engine, upon energization of a controlling motor, the throttle valve is caused to rotate in the normal rotation direction against the urging force of the return spring acting in the reverse rotation direction. The throttle valve is then retained slightly opening only to allow the necessary intake amount of air for idling to pass through the air-intake passage.

When an accelerator pedal is depressed, upon current conduction to the controlling motor, the throttle valve is caused to rotate in the normal rotation direction against the urging force of the return spring acting in the reverse rotation direction, or to rotate in the reverse rotation direction. The throttle valve is rotated from the fully closed position (in the idling condition) to the fully opened position in proportion to the opening of the accelerator. The urging device always exerts the urging force on the throttle valve in only one direction (i.e., the reverse rotation direction). Thus, there is no need to control the motor to rotate in reverse.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a throttle valve control device embodying the present invention will now be given referring to the accompanying drawings.

Figure 1:
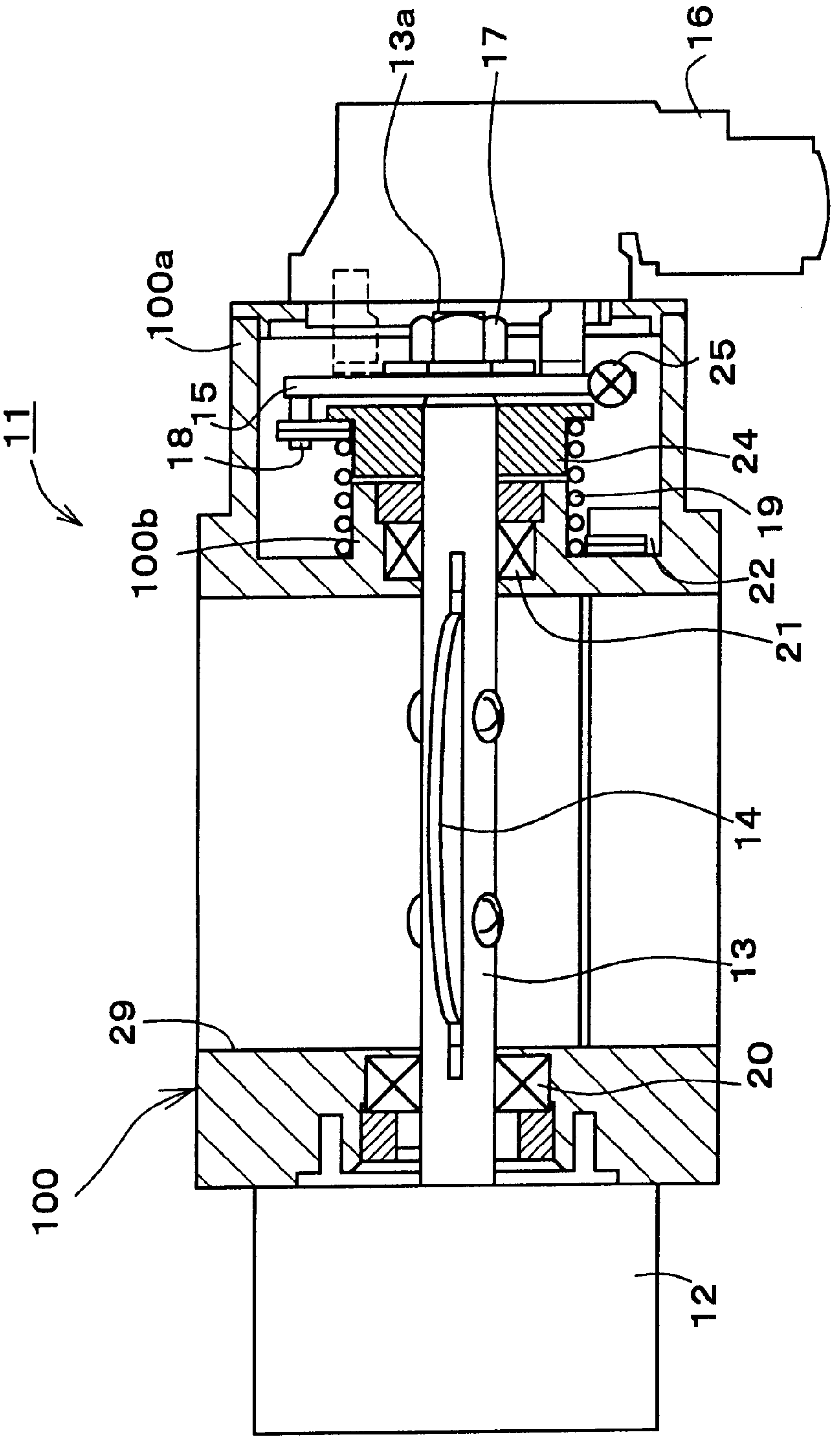
FIG. 1 is a cross sectional view of a throttle valve control device in a preferred embodiment according to the present invention.
Figure 4:
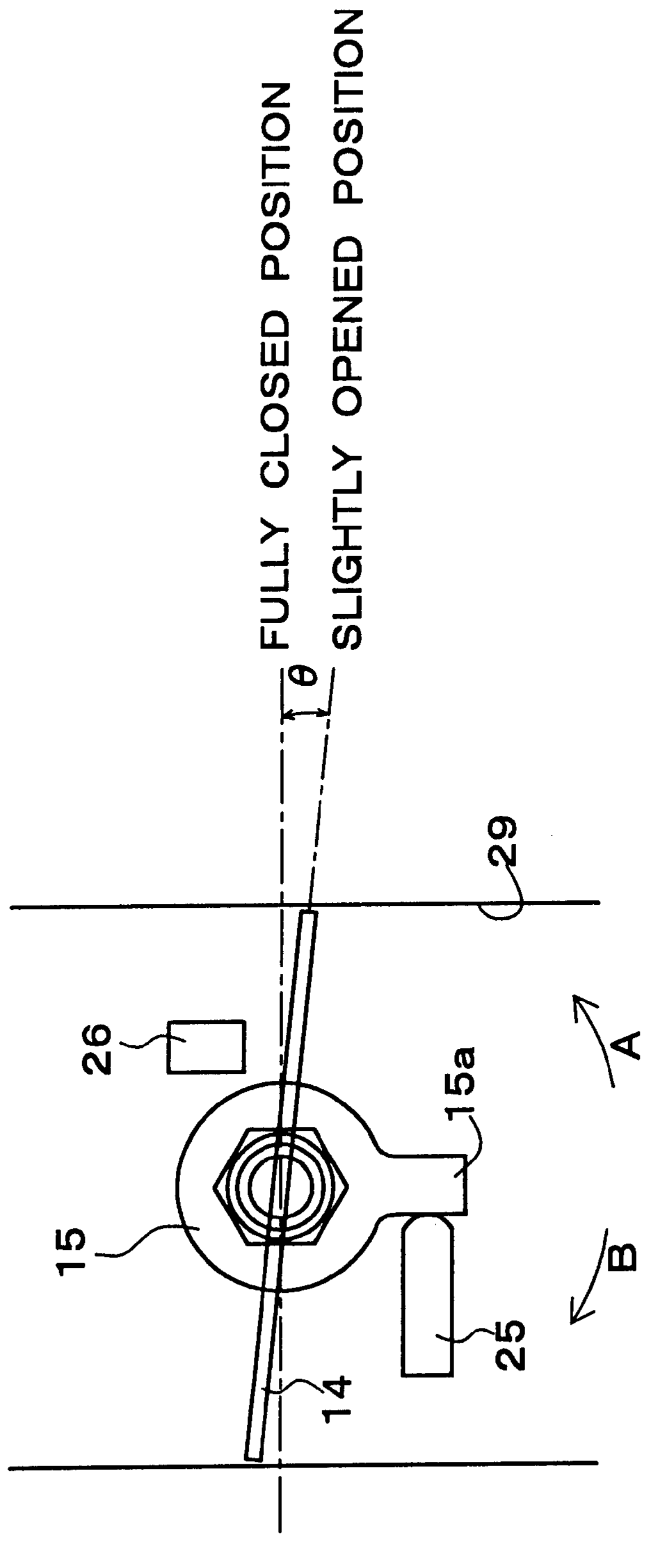
FIG. 4 is a right side view of the throttle valve control device of FIG. 1, a throttle sensor being removed therefrom, in the embodiment.

FIG. 1 is a cross sectional view of the throttle valve control device 11 in the present embodiment. FIG. 4 is a right side view of the device from which a throttle sensor 16 is removed.

In FIG. 1, the throttle valve control device 11 has a cylindrical air-intake passage 29 formed inside a housing 100. The air-intake passage 29 constitutes a part of an air-intake passage of an engine of an automobile.

Inside the housing 100, a main shaft 13 is rotatably held at both ends thereof by bearings 20 and 21. More specifically, the shaft 13 is supported such that its axis coincides with the diametrical center line of a circular cross section of the cylindrical passage 29 and that the both ends protrude outwardly through the bearings 20 and 21 respectively. The shaft 13 is provided with a longitudinal slit formed along the shaft axis. A throttle vale 14 is fitted in the slit and fixed to the shaft 13 by screws. The throttle valve 14 is formed in a circular plate shape with substantially the same dimensions as the sectional dimensions of the air-intake passage 29 in the diameter direction, so that the throttle valve 14 can open and close the passage 29.

The throttle valve 14 is rotated in the direction indicated by A in the state of FIG. 4 to open the passage 29, while in the direction indicated by B to close it. It is to be noted that the direction A is hereinafter regarded as a normal rotation direction and the direction B, as a reverse rotation direction.

To the housing 100, a controlling motor 12, for example, a step motor is mounted, which is connected to an end (a left end in FIG. 1) of the main shaft 13. The rotation of an output shaft of the motor 12 when driven is transmitted to the shaft 13, causing the throttle valve 14 to rotate in a predetermined direction thereby to open or close the intake passage 29. Thus, the air-intake quantity of the engine is regulated.

The housing 100 is provided with a boss 100*b* supporting the bearing 21 for the main shaft 13 and a protruding wall 100*a* surrounds the boss 100*b*. The wall 100*a* and the boss 100*b* are formed into one body.

A right end of the main shaft 13 (in FIG. 1) is formed into a small diameter portion 13*a* which has a male screw on an outer periphery and a cross section in a substantially oval form with width across flats. On the main shaft 13 is mounted a lever 15 having a substantially circular plate form with a convex contact member 15*a*. Specifically, a mounting hole having a substantially oval form corresponding to the shape of the small diameter portion 13*a* is formed in the center of the lever 15. By insertion of the small diameter portion 13*a* into the mounting hole, the lever 15 is secured to the portion 13*a* of the main shaft 13 by a nut 17.

The contact member 15*a* of the lever 15 comes into contact with a full open stopper 26 at a position where the throttle valve 14 is fully opened. To the contrary, the contact member 15*a* comes into contact with an adjustment screw 25 when the throttle valve 14 has been rotated by a predetermined angle θ from the fully closed position in the reverse rotation direction to a slightly opened position N. The adjustment screw 25 is attached to the housing protruding wall 100*a* so as to radially extend inside the wall 100*a*. This adjustment screw 25 acts to stop the rotation of the lever 15 by contacting the contact member 15*a* when the lever 15 is rotated in the reverse rotation direction. The adjustment screw 25 is disposed such that its axis is parallel to a tangential line of the lever 15.

Turning the adjustment screw 25 to move forward or backward, the contact position of the contact member 15*a* to the screw 25, namely, the set position of the opening of the throttle valve 14 can be adjusted. The purpose of this adjustment is to set the opening of the throttle valve 14 to prevent the engine starting failure caused by the impossibility to open the throttle valve 14 as mentioned above, or to enable shunk travel of an automobile when it has engine trouble.

A spring guide 24 made of resin is fitted on the main shaft 13 between the housing boss 100*b* and the lever 15. A return spring 19 which is a double system torsion spring is wound on the outer periphery of the spring guide 24 and the boss 100*b*. This double system torsion spring is an integral structure made of two torsion springs which are identical in material, size, and so on.

An end of the return spring 19 engages a stop member 22 formed in the protruding wall 100*a*, and another end engages a stop pin 18 of the lever 15. This return spring 19 acts to always urge the lever 15 in the reverse rotation direction of the throttle valve 14, that is to say, to urge the contact member 15*a* of the lever 15 in the direction where the contact member 15*a* contacts the adjustment screw 25.

The urging force of the return spring 19 is set to be smaller than the driving torque exerted on the main shaft 13 by the motor 12, but larger than the stopping torque at the time of deenergization of the motor 12. This setting is to cause the throttle valve 14 to open or close against the urging force at the time of energization of the motor 12, and to retain the valve 14 in the slightly opened position N at the time of deenergization of the motor 12.

The throttle sensor 16 is fixed to the protruding wall 100*a* of the housing 100 so as to cover the inside of the protruding wall 100*a*. An interlocking piece provided in the lever 15 so as to outwardly protrude is engaged with a detecting piece of the throttle sensor 16. This sensor 16 thus detects the rotational position of the lever 15, namely, the opening position of the throttle valve 14.

Next, the operation of the throttle valve control device constructed as above will be explained.

Figure 2:
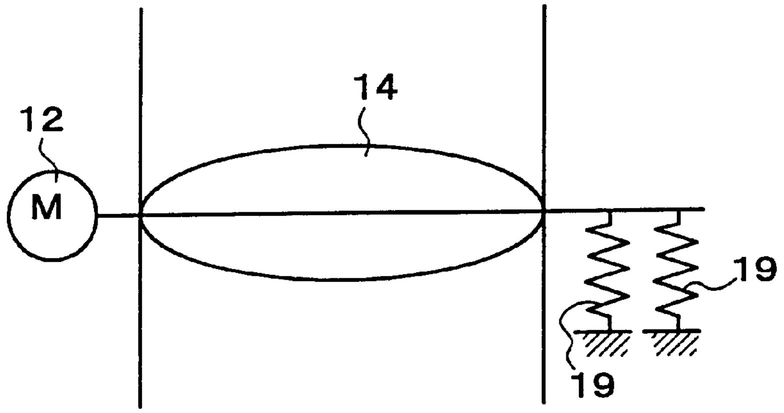
FIG. 2 is an explanatory view showing a relationship between an urging force of a return spring and a driving torque of a controlling motor in the throttle valve control device in the embodiment.

FIG. 2 shows a relationship between the urging force of the return spring 19 and the driving torque of the motor 12.

The throttle valve control device in the present embodiment only has a torsion spring having urging force acting in a single direction as shown in FIGS. 1 and 4. The urging force of the double system return spring 19 always acts in the reverse direction irrespective of the rotational position of the lever 15, namely, the opening position of the throttle valve 14. The driving torque of the controlling motor 12 is thus transmitted at all times to the shaft 13 against the urging force of the double system return spring 19.

Each of the torsion springs forming the double system return spring 19 is designed to have larger urging force than the stop torque at the time of deenergization of the motor 12. Accordingly, even if one of the springs is broken, the throttle valve 14 can be retained in the slightly opened position N by the urging force of the other spring.

Figure 3:
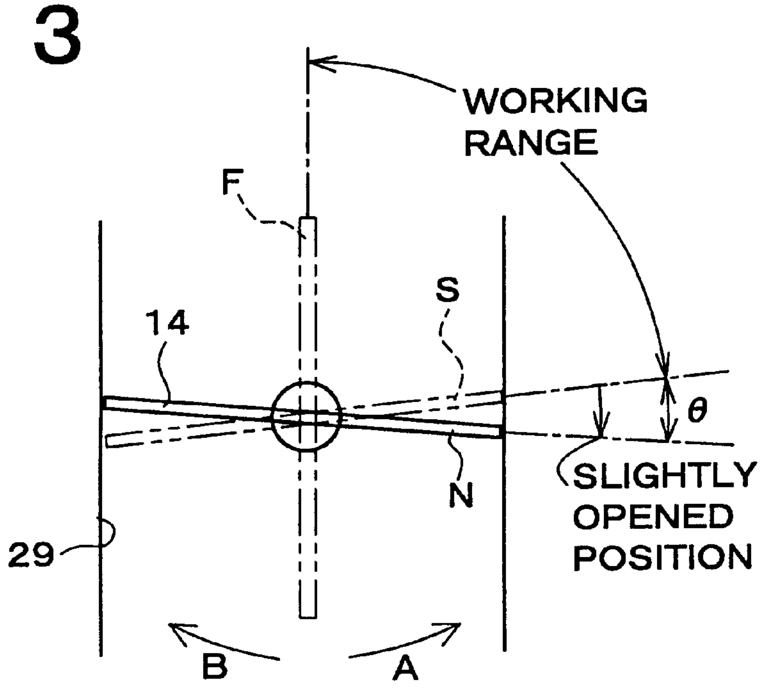
FIG. 3 is an explanatory view of an operational state of the throttle valve control device in the embodiment.
Figure 5:
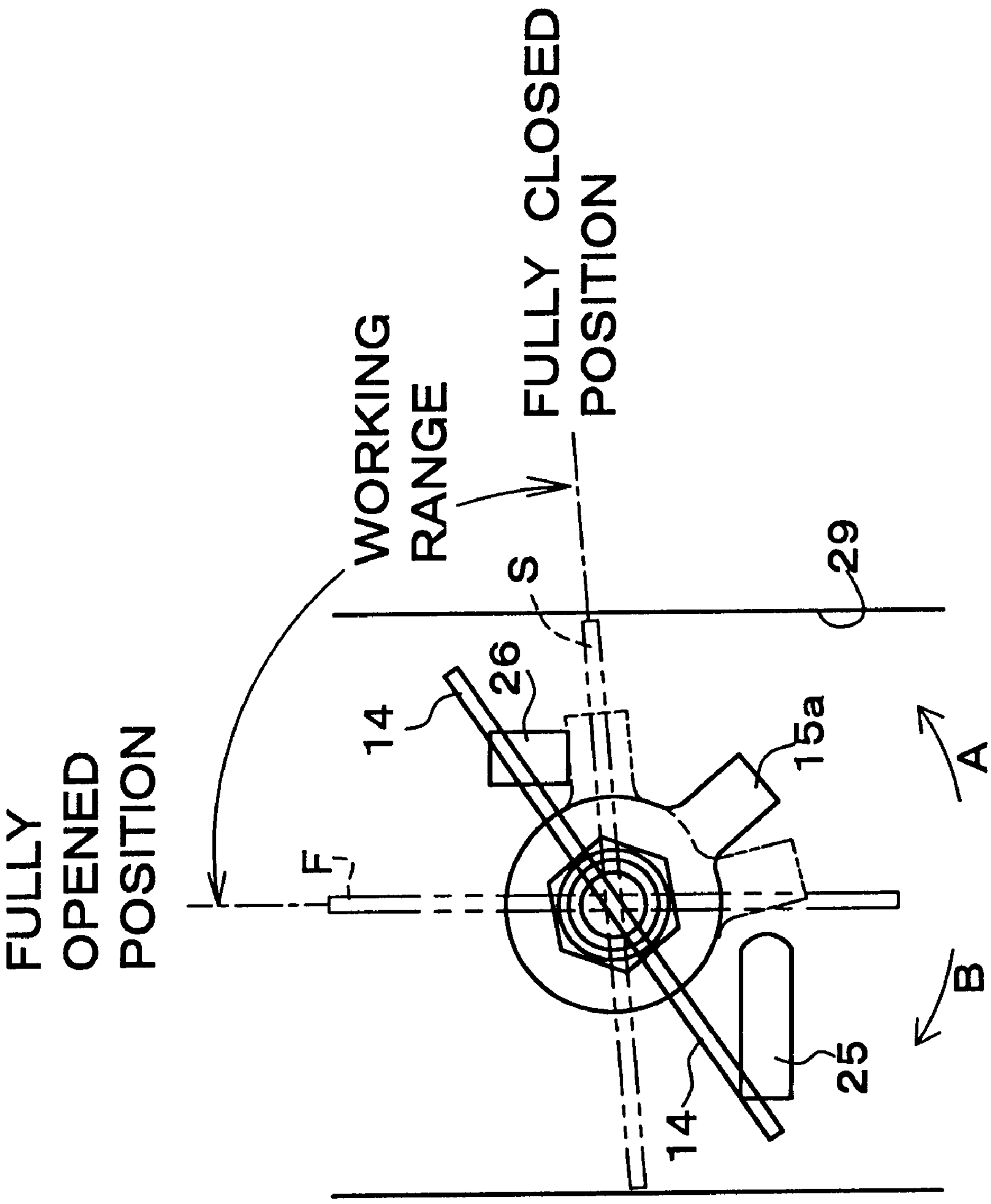
FIG. 5 is an explanatory view of an operational state of the throttle valve of the device of FIG. 4.

FIGS. 3 and 5 show the operational position of the throttle valve 14 in the air-intake passage 29. In those drawings, the throttle valve 14 is rotated in the direction A (the normal rotation direction) to open the air-intake passage 29, and in the direction B (the reverse rotation direction) to close the passage 29.

Upon deenergization of the motor 12 when the engine is stopped and so on, the lever 15 receives the urging force of the return spring 19, as shown in FIGS. 1 and 4, to rotate until the contact member 15*a* contacts the adjustment screw 25. The lever 15 is then stopped to rotate. The opening position of the throttle valve 14 in this state, namely, in the slightly opened position N, is determined based on the stop position of the lever 15, the stop position having been set by the adjustment screw 25. With the throttle valve 14 retained in the initial opening position, the engine is put into a start waiting condition.

This initial opening position is the predetermined position where the throttle valve 14 is retained after rotated by a predetermined angle θ from the fully closed position, namely, the fully closed position S in the reverse rotation direction. By the valve 14 in this position, the air-intake passage 29 is opened by a predetermined amount. Retaining the throttle valve 14 in such the state can previously prevent the situations that the throttle valve 14 is unable to open when the main shaft 13 and the valve 14 freeze or ice under low temperatures in a cold district and so on, or if combustion products which are generated with the engine motion adhere to the valve 14.

Upon start of the engine, the throttle valve 14 being in the slightly opened position N is controlled by the controlling motor 12 in proportion to the engine driving condition to regulate the intake quantity of air allowed to pass through the passage 29.

In the idling state, when an accelerator pedal is not depressed, the throttle valve 14 is rotated by the motor 12 in the normal rotation direction to the fully closed position S. This fully closed position S is the position where the throttle valve 14 is so slightly opened as to allow only the necessary quantity of intake air for the idling to pass through the passage 29, and also indicates the most closed position of the valve 14 within the working range during engine energization.

The fully closed position S of the throttle valve 14 is determined by the control of the motor 12. While the valve 14 is in this position, the motor 12 is energized to generate the torque larger than the urging force of the return spring 19 which urges the lever 15 in the reverse direction, and the valve 14 is retained in the fully closed position S.

Subsequently, when the accelerator pedal is depressed, the motor 12 is driven in proportion to the pedal depressing quantity and the throttle valve 14 is rotated to the predetermined opened position. While the engine is running, the throttle valve 14 is rotated within the working range between the fully closed position S and the fully opened position F.

In the fully opened position F, the contact member 15*a* of the lever 15 is in contact with the stopper 26, so that the air-intake passage 29 is retained in the maximum opened position. The stopper 26 serves to prevent the misoperation that the throttle valve 14 is rotated beyond the fully opened position F in the normal rotation direction.

The return spring 19 always exerts the urging force in the reverse rotation direction on the lever 15 while the throttle valve 14 is held in the working range from the fully closed position S to the fully opened position F. Accordingly, the controlling motor 12 is energized to generate the torque larger than the urging force of the spring 19 to rotate the throttle valve 14 to the predetermined position in proportion to the depressing quantity of the accelerator pedal.

Figure 6:
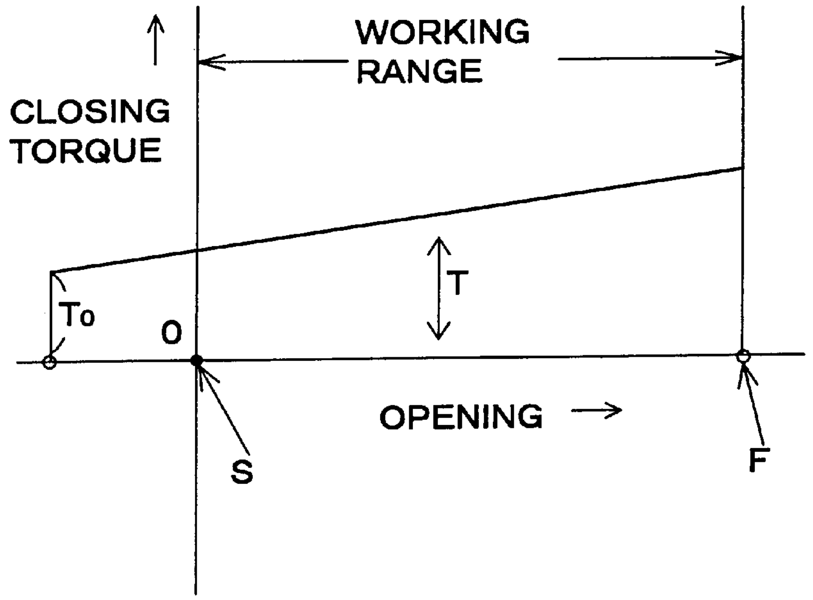
FIG. 6 is a graph explaining a relationship between an opening of the throttle valve and the urging force exerted on a main shaft in the throttle valve control device in the embodiment.

FIG. 6 is a graph showing a relationship between the opening of the throttle valve 14 and the urging force exerted on the main shaft 13. The horizontal axis of the graph represents the opening of the valve 14, wherein the opening in the normal rotation direction is laid in a positive side with respect to the fully closed position S regarded as a reference point. The vertical axis represents the urging force of the return spring 19 which acts on the main shaft 13 through the lever 15. In the vertical axis, the closing torque in the reverse rotation direction is laid in a positive side. When the valve 14 is in the slightly opened position N, the return spring 19 applies the initial urging force $T_0$ to the lever 15. As the throttle valve 14 is rotated in the normal rotation direction, the urging force of the spring 19 increases and then reaches the maximum at the fully opened position F. The urging force of the spring 19 always acts on the lever 15 in the reverse rotation direction of the throttle valve 14.

When the controlling motor 12 is deenergized by the engine stop and so on, the throttle valve 14 is rotated to the slightly opened position N and the engine is placed in a start waiting condition. More specifically, upon deenergization of the motor 12, the lever 15 receiving the urging force of the return spring 19 is rotated in the same direction as the reverse rotation direction of the throttle valve 14. The contact member 15*a* of the lever 15 is then brought into contact with the adjustment screw 25, when the throttle valve 14 is held in the slightly opened position N.

It is to be noted that the rotation of the lever 15 is transmitted to the controlling motor 12 through the main shaft 13, so that the motor 12 receives a reverse driving force.

Figure 7:
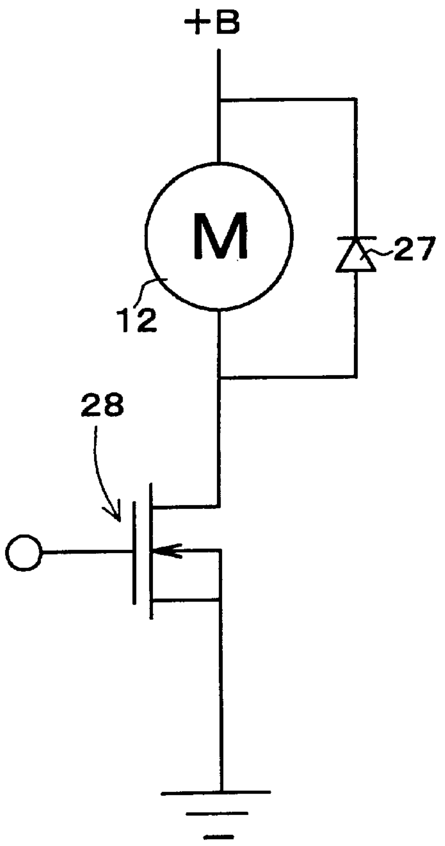
FIG. 7 is a schematic diagram of the controlling motor and a circuit for controlling the motor in the throttle valve control device in the embodiment.
Figure 8:
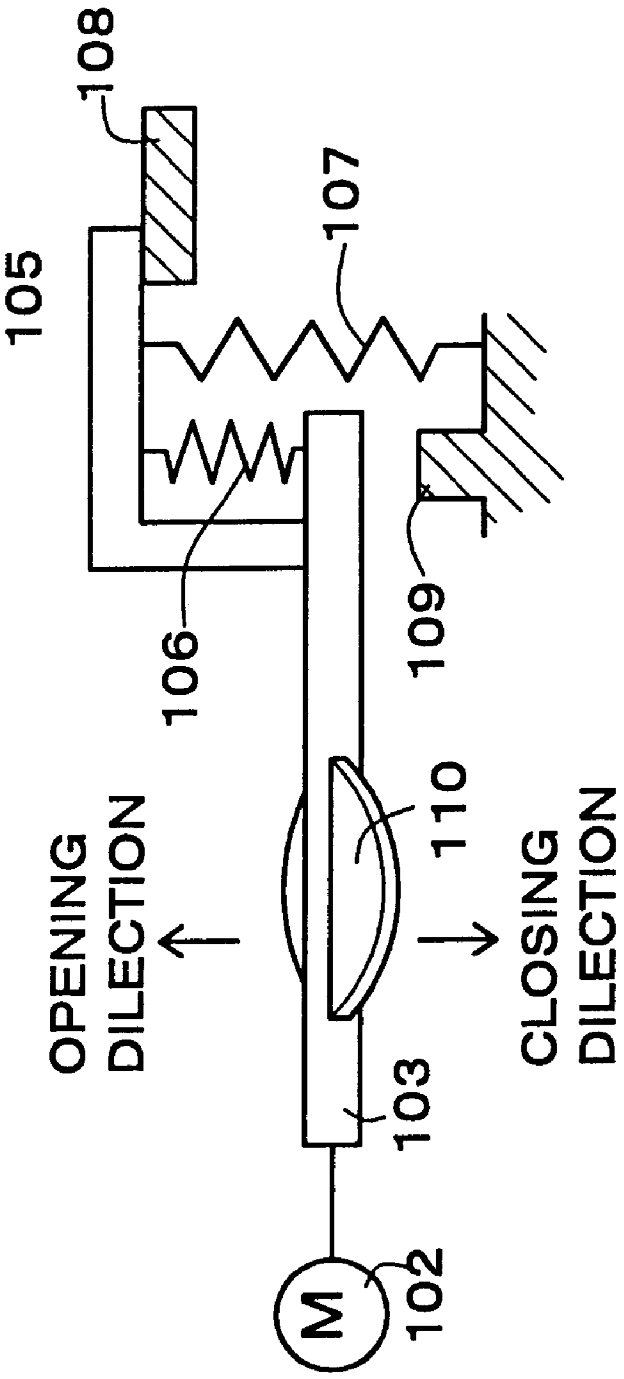
FIG. 8 PRIOR ART
FIG. 8 is a schematic diagram of the whole structure of a throttle valve control device in the prior art.
Figure 9:
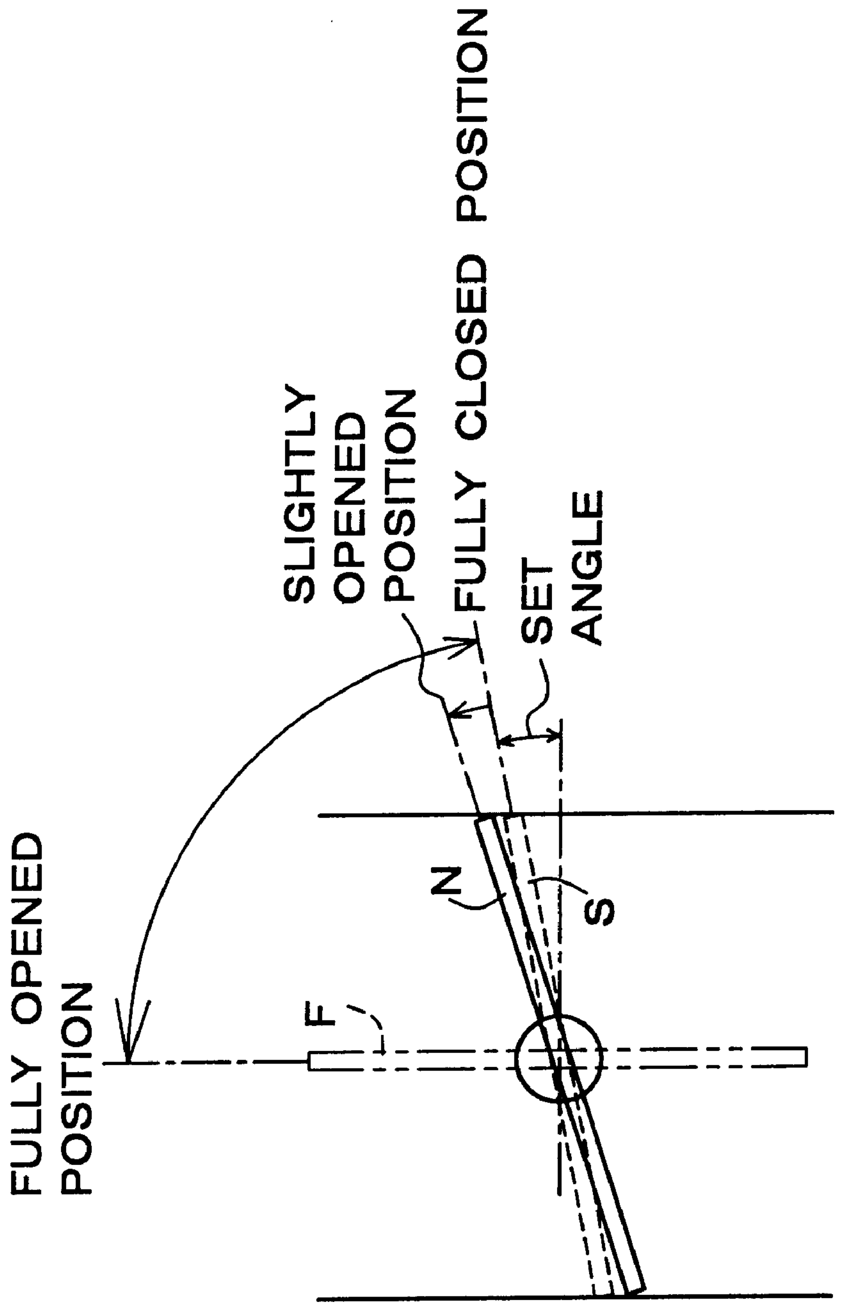
FIG. 9 PRIOR ART
FIG. 9 is an explanatory view of an operational state of a throttle valve in the throttle valve control device in the prior art.
Figure 10:
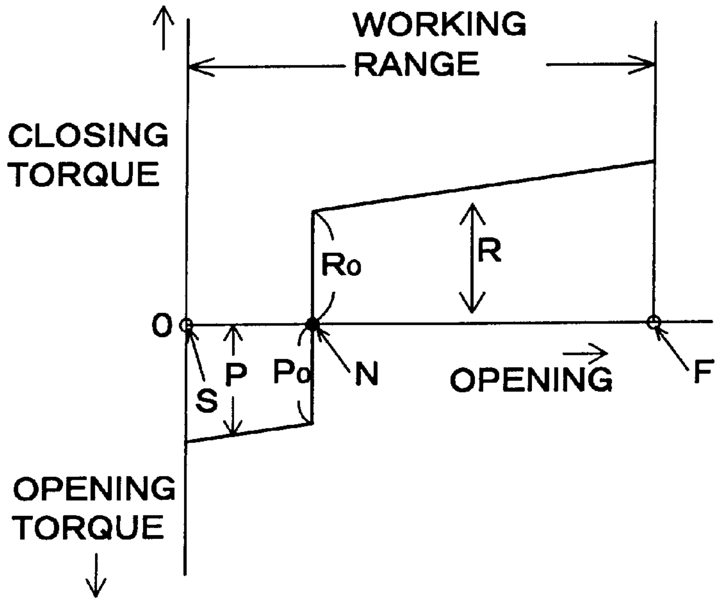
FIG. 10 PRIOR ART
FIG. 10 is an explanatory view showing a relationship between an opening of the throttle valve and an urging force exerted on a main shaft in the throttle valve control device in the prior art.
Figure 11:
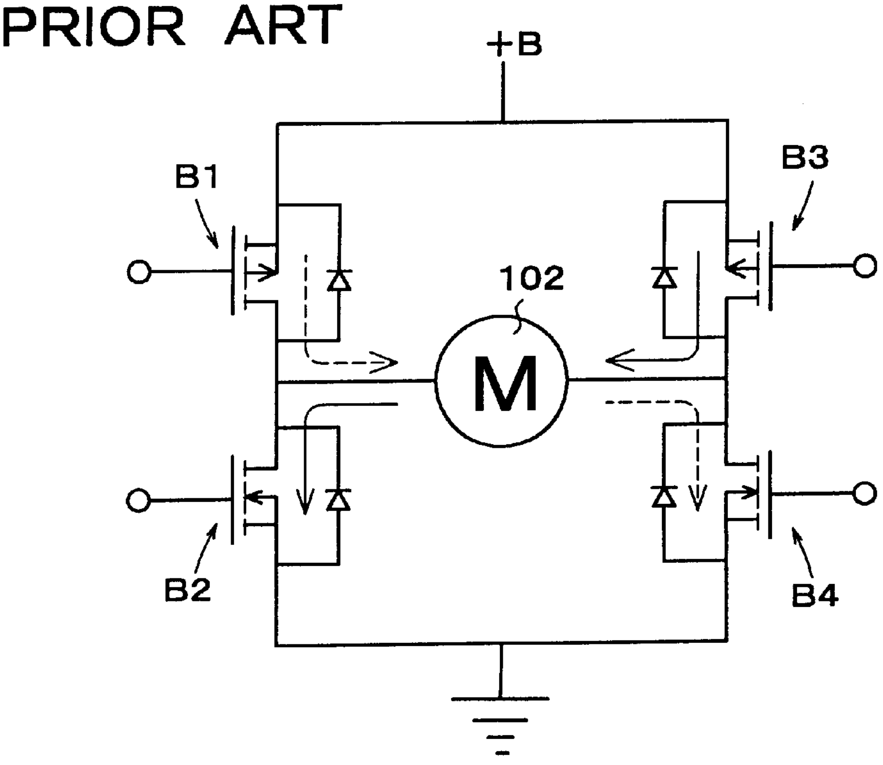
FIG. 11 PRIOR ART
FIG. 11 is a schematic diagram of a circuit for controlling a controlling motor in the throttle valve control device in the prior art.

FIG. 7 shows the motor 12 and a circuit for controlling the motor 12.

This controlling motor 12 is connected with a diode 27 which serves to release the electricity generating when the controlling motor 12 receives the reverse driving force at the time of the deenergization. A transistor 28 causes the motor 12 to generate the driving torque corresponding to the closing torque shown in FIG. 6.

As explained above in detail, in the throttle valve control device 11 in the present embodiment, which controls the throttle valve 14 for closing and opening the air intake passage 29 of the engine such that the valve 14 rotates in the normal rotation direction from the fully closed position S to the fully opened position F, and in the reverse rotation direction from the fully opened position F to the fully closed position S, there are provided the return spring 19 for urging the throttle valve 14 in the reverse rotation direction and the adjustment screw 25 for stopping the valve 14 at the predetermined position to which the valve 14 has been rotated by the predetermined angle θ from the fully closed position S in the reverse rotation direction. In contrast to the conventional throttle valve control device having two urging devices acting in opposite directions, the throttle valve control device in the present embodiment has a single urging device acting in the same direction, so that the lever, stopper, and the like which engage with the urging devices in the conventional device can be omitted. Since the urging device acts in the same direction within the working range of the throttle valve 14, there is no need for providing the bridge circuit for rotating the controlling motor 12 in reverse as the conventional device.

Consequently, the throttle valve control device 11 in the present embodiment according to the invention can achieve the reduction in size and thus provide superior cost performance as compared with the conventional throttle valve control device.

The present invention may be embodied in other specific forms without departing from the spirit or essential characteristics thereof. For instance, although the double system torsion spring used in the above embodiment is constructed of the springs that are identical in material, size, and others, they may be changed to have different spring power.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated.

It is intended that the scope of the invention be defined by the claims appended hereto, and their equivalents.

What is claimed is:

1. A throttle valve control device including:

a throttle valve for opening and closing an air intake passage of an engine for an automobile;

a rotating device for causing the throttle valve to rotate in a normal direction from a fully closed position to a fully opened position, and to rotate in a reverse direction from the fully opened position to the fully closed position;

an urging device for urging the throttle valve in the reverse direction; and a stopper member for stopping the throttle valve at a predetermined position located by a predetermined angle beyond the fully closed position in the reverse direction, the throttle valve being rotatable in the reverse direction through the fully closed position to the predetermined position.

2. The throttle valve control device according to claim 1, wherein the predetermined position of the throttle valve enables starting of the engine even if the throttle valve ices or freezes under low temperatures.

3. The throttle valve control device according to claim 1, wherein the predetermined position of the throttle valve provides a minimum opening required for shunt travel of an automobile.

4. The throttle valve control device according to claim 1, wherein the urging device always urges the throttle valve in the reverse rotation direction.

5. The throttle valve control device according to claim 1, wherein the urging device includes a double system torsion spring comprising an integral structure of two torsion springs of identical material and size.

6. The throttle valve control device according to claim 5, wherein one of the two springs of the double system torsion exerts an urging force adequate to retain the throttle valve in the predetermined position in the event that the other spring is broken.

7. The throttle valve control device according to claim 1, wherein the rotating device includes a torque motor, and the urging force of the urging device is smaller than the driving torque of the torque motor but larger than the torque at the torque motor upon deenergization of the torque motor.

* * * * *

UNITED STATES PATENT AND TRADEMARK OFFICE

CERTIFICATE OF CORRECTION

PATENT NO. : 6,164,623
DATED : December 26, 2000
INVENTOR(S) : Yoshiki Ito et al.

It is certified that error appears in the above-identified patent and that said Letters Patent is hereby corrected as shown below:

Title page,
Inventor name should be added, -- Shinji Ikeda, Aichi-Ken Japan --

Signed and Sealed this

First Day of January, 2002

*Attest:*

JAMES E. ROGAN

*Attesting Officer*

*Director of the United States Patent and Trademark Office*